United States Patent [19]
Andersen et al.

[11] Patent Number: 5,674,003
[45] Date of Patent: Oct. 7, 1997

[54] MECHANISMS FOR ACCESSING UNIQUE FEATURES OF TELEPHONY NETWORKS FROM A PROTOCOL-INDEPENDENT DATA TRANSPORT INTERFACE

[76] Inventors: David B. Andersen, 16520 SW. Hillsboro Hwy., Hillsboro, Oreg. 97123; Tsung-Yuan Charles Tai, 2496 NW. 141st Pl., Portland, Oreg. 97229

[21] Appl. No.: 430,460

[22] Filed: Apr. 28, 1995

[51] Int. Cl.$^6$ .................................................. G06F 17/00
[52] U.S. Cl. ................................................ 364/514 R
[58] Field of Search ....................... 364/514 R, 514 C; 370/85.7, 60.1; 395/200.17, 200.11

[56] References Cited

U.S. PATENT DOCUMENTS

| | | | |
|---|---|---|---|
| 5,375,068 | 12/1994 | Palmer et al. | 364/514 C |
| 5,408,465 | 4/1995 | Gusella et al. | 370/60 |
| 5,491,694 | 2/1996 | Oliver et al. | 370/85.7 |
| 5,550,984 | 8/1996 | Gelb | 395/200.17 |
| 5,555,244 | 9/1996 | Gupta et al. | 370/60.1 |

OTHER PUBLICATIONS yang et al.; "Cell Scheduling And Bandwidth Allocation For Heterogeneous VBR Video Conferencing Traffic." Globecom 1995 Communications For Global Harmony 1995.
Anastasi et al.; "service integration in crma: a simulative analysis"; infocom 1993.
Delgrossi et al.; "HEITP–A Transport Protocol For ST–II"; Globecom 1992.

*Primary Examiner*—Ellis B. Ramirez
*Attorney, Agent, or Firm*—Blakely, Sokoloff, Taylor & Zafman

[57] ABSTRACT

In a computer video conferencing system it is often necessary to transmit multiple channels of information between remote computers, such as a video channel, an audio channel and data sharing channel. A socket based transport interface can be utilized to establish communication channels between remote computers over a connection oriented telephony network. A plurality of sockets are created at each endpoint, one for each type of data stream to be transferred between the computers. The sockets are formed into a group to indicate to the computer transport service provider that the data streams from the sockets can utilize the same telephony connection, and a quality-of-service specification is associated with the socket group so that the telephony connection can be established according to the requirements of the socket group. If a new data stream needs to be transmitted and there is already a telephony connection established, a new socket is created and added to the existing socket group. If the newly added socket significantly affects the quality-of-service requirements of the socket group, a new quality-of-service may be negotiated with the telephony network.

13 Claims, 5 Drawing Sheets

MECHANISMS FOR ACCESSING UNIQUE FEATURES OF TELEPHONY NETWORKS FROM A PROTOCOL-INDEPENDENT DATA TRANSPORT INTERFACE

BACKGROUND OF THE INVENTION

1. Field of the Invention

This invention relates to the field of telecommunications between computers, such as may be employed in conferencing between remote computer systems interconnected by way of a connection-oriented telephony network.

2. Background

As computers and the capabilities of telecommunication systems become more powerful, and computer systems become more heavily networked, there is an increasing need for computers to provide mechanisms by which the capabilities of the telecommunications systems can be more fully exploited.

Presently, communication between two computer processes can be implemented by utilizing a "socket" mechanism. A socket, as popularized in the Berkeley Software Distribution (BSD) of implementation of the Unix (TM) operating system, is essentially an endpoint of communication. A socket in use usually has an address logically bound to it; the nature of the address depending upon the communication domain of the socket. A characteristic property of a communication domain is that processes communicating in the same domain use the same address format. For example, Unix (TM) 4.3BSD includes a Unix (TM) domain and an Internet domain. The address format of the Unix domain comprises ordinary file-system path names, such as/alpha/beta/gamma. Processes communicating in the Internet domain, on the other hand, utilize Defense Advanced Research Projects Agency (DARPA) Internet communication protocols, such as TCP/IP (Transmission-Control-Protocol/Internet-Protocol), and Internet addresses, which consist of a 32-bit host number and a 16-bit port number. Thus, two processes within the Unix domain, such as programs or routines operating on the same computer system, can communicate between each other by establishing respective sockets in the Unix (TM) domain and a logical connection therebetween for data to pass from one to the other.

Two processes which operate on separate but inter networked computers can communicate with one another by establishing respective sockets in the Internet domain. Data can then be passed between the processes by way of the respective sockets by either connection-oriented stream-data transmission, or connectionless datagram packet transmission, depending upon the type of sockets established. In the case of stream-data transmission a connection from one socket to another across the network is established according to the Internet Protocol (TCP/IP) addressing scheme, which uniquely identifies the intended receiving socket to which the connection is established. In the case of datagram packet data transmission, each datagram is provided with the IP address of the receiving socket to enable each packet of the data to be routed through the network.

The Windows (TM) Sockets Interface, referred to as WinSock (TM), is an Application Programming Interface (API) for enabling computers which operate under the Windows (TM) operating system to implement a socket interface similar to BSD Unix (TM). The WinSock (TM) API includes a Dynamic Linked Library (DLL) which is a library of functions that enable an application to utilize TCP/IP socket communication capability by providing functions which, for example, create a socket, bind a name to the created socket, establish a connection to another socket (for a stream-data socket) or transmit data packets (for a datagram socket, together with related functions.

Most data transport interfaces, such as the BSD Unix (TM) sockets interface and the WinSock (TM) API mentioned above, support the notion of multiple communications endpoints or communications channels being multiplexed together across a single network interface. While current data transport interfaces work well for both local area networks (LANs) and wide area networks (WANs) that employ connectionless network layer protocols (e.g. TCP/IP, IPX/SPX, etc.), there are a number of problems exposed in utilizing the same communication methods for connection-oriented network layer protocols typical of telephony networks. It would therefore be advantageous to provide methods and mechanisms by which interprocess communication can be effected by way of a connection-oriented telephony network to exploit the characteristics of the telephony network not available or not required in a connectionless network such as a LAN or WAN.

SUMMARY OF THE INVENTION

In accordance with the present invention, there is provided a method for communicating a plurality of data streams from at least one first computer process operating on a first computer under a socket based transport interface to at least one second computer process operating on a second computer under a socket based transport interface, by way of a connection-oriented telephony network, comprising the steps of: creating a first socket group comprising a first plurality of socket communication endpoints for use by said at least one first computer process on said first computer; determining a required quality-of-service associated with said first socket group; establishing a telephony connection by way of said connection-oriented telephony network between said first and second computers, said telephony connection having a quality-of-service at least equal to said required quality-of-service; creating a second socket group comprising a second plurality of socket communication endpoints for use by said at least one second computer process on said second computer, and establishing a plurality of communication channels between each of said first plurality of sockets and corresponding ones of said second plurality of sockets; and transmitting a plurality of data streams between said at least one first process on said first computer and said at least one second process on said second computer by way of said plurality of communication channels multiplexed on said telephony connection.

The formation of socket communication endpoints into socket groups allows the transport interface to deal with the transmission of data between the grouped sockets more efficiently in a connection-oriented communications environment, because data streams from grouped sockets can be transmitted over the same telephony connection, rather than requiring the establishment of separate telephony connections as might ordinarily be the case in prior art socket based communication methods. In one aspect of the invention, additional advantages can be obtained from the grouping of sockets by including a step of assigning a priority to each of the sockets in the group, the assigned priority for each socket designating the relative importance of the data stream from that socket for transmission over the telephony connection. In some instances the bandwidth of the telephony connection for data transmission may be less than the instantaneous combined bandwidth of data streams from the sockets comprising the socket group, in which case transmission of one or more of the data streams may need to be suspended or reduced. By assigning relative priorities to the sockets within the group, the transport interface can determine which data stream to suspend, being the data stream originating from the socket with the lowest assigned priority. Thus, in one aspect of the invention the method may additionally include a step of temporarily suspending transmission of data from a socket having a lowest assigned priority amongst said and second plurality of sockets comprising said first and second socket groups.

An example of where the method of the invention can be advantageously employed is a computer conferencing system, wherein video data, audio data and graphical and/or text data is transmitted via a telephony connection between two computers. In this instance a separate socket communication endpoint is created at each computer for each of the video, audio and graphics/text data streams, and connections established between the respective sockets by way of the telephony connection. The separate data streams are multiplexed for transmission over the telephony connection and, in normal operation, the bandwidth of the telephony connection is shared between all of the data streams from the sockets comprising the socket groups associated with the conferencing application. Priorities for the sockets are assigned according to the importance of the data streams to be transmitted therefrom. In this example, the socket associated with the audio data stream may be assigned the highest priority, the socket for passing graphics/text the next higher priority, and the video data socket the lowest priority. Therefore, if the bandwidth of the telephony connection was not sufficient to pass all three data streams, the assigned priorities provide the transport interface with information sufficient to make a derision as to which socket supplies data which, if transmission were suspended, would have the least impact on the operation of the conferencing system.

In some telecommunications systems such as Integrated Services Digital Networks (ISDN) and Asynchronous Transfer Mode (ATM) networks, it is possible to take particular advantage of the ability provided by the present invention to specify a quality-of-service for a socket group since it is generally possible to specify the required characteristics of a telephony connection at the time the connection is established. Thus, when a telephony connection established in order to service the transmission of data streams between groups of socket communication endpoints, the transport interface can negotiate with the telecommunications provider to ensure that the quality-of-service allocated to the telephony connection is consistent with the required quality-of-service that is associated with the socket groups. In addition to providing parameters specifying the group quality-of-service, there may also be provided, in accordance with one aspect of the invention, an indication of a level of guarantee for the socket group, wherein if the quality-of-service able to be provided by the telephony network does not match the required quality-of-service associated with the socket group, the transport interface will accept the telephony connection depending upon the value for the level of guarantee for the socket group.

In one form of the invention the method includes creating a further socket at said first computer, after the establishment of said telephony connection, designating said further socket as belonging to said first socket group, and establishing a connection to a corresponding socket at said second computer by way of said telephony connection. The method of the invention may also include, during the step of establishing said telephony connection, a step of placing a telephone call on said telephony network on the basis of the determined address, and monitoring progress of the call according to signals received from the telephony network in response to placing the call.

Other features and advantages of the present invention will be apparent from the appended claims, and from the detailed description of the invention that follows below.

BRIEF DESCRIPTION OF THE DRAWINGS

The invention is described in greater detail hereinafter, by way of example only, with reference to the accompanying drawings in which.

DETAILED DESCRIPTION OF THE PREFERRED EMBODIMENT

The present invention is described in detail hereinbelow by reference to a preferred embodiment thereof which comprises a conferencing system as may be employed to communicate signals between remote computer systems. In the following description, numerous specific details are set forth in order to provide a thorough understanding of the invention. However, it will be apparent to one of ordinary skill in the art that these specific details need not be used to practice the present invention. In other instances, well known structures, circuits, and interfaces have not been shown in detail in order not to obscure unnecessarily the present invention.

Figure 1:
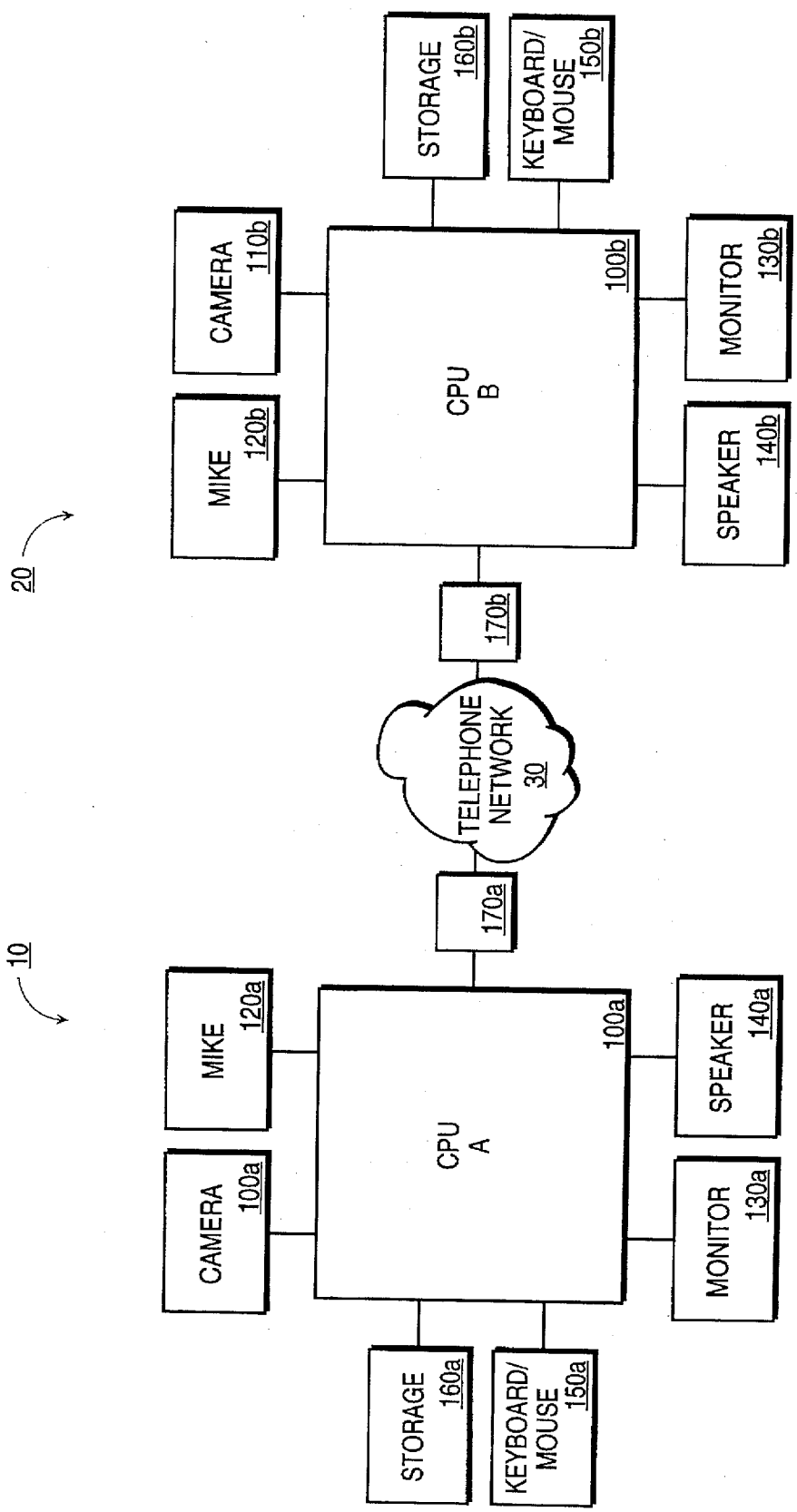
FIG. 1 is a block diagram of a computer video conferencing hardware arrangement in accordance with a preferred embodiment of the present invention.

Referring now to FIG. 1, there is shown a block diagram of computer system and telecommunications hardware which may be employed to implement a conferencing system according to an embodiment of the invention. A first computer system 10 (sometimes referred to as the local site or endpoint) is provided, having a processing unit (CPU) 100A which may comprise, for example, a personal computer based on an 80×86 microprocessor or Pentium (TM) microprocessor available from Intel Corporation of Santa Clara, Calif. The computer system 100A also includes input, output and storage devices coupled to the CPU 100A, comprising a microphone 120A, a digital video camera 110A, an audio speaker 140A, a monitor 130A, a keyboard and/or pointer input device 150A and a storage device 160A which may include magnetic disk storage and/or semiconductor memory storage. The CPU 100A of the computer system 10 is coupled to a connection oriented telephony network 30 by way of a telecommunications interface 170A. The telephony in this embodiment of the invention comprises an Integrated Services Digital Network (ISDN), and the telecommunications interface thus comprises an ISDN interface device as are known in the art. In other applications of the invention, however, a different form of telephony network may be employed, such as the plain old telephony service (POTS) portion of the Public Switched Telephony Network (PSTN), in which case the telecommunications interface 170A may be a modem device.

Also coupled to the telephony network 30 is a computer system 20 (sometimes referred to as the remote site or endpoint), which preferably comprises a similar hardware configuration to the local site computer system 10. Thus, the remote site computer system 20 includes a CPU 100B coupled to peripheral devices such as a microphone 120B, a video camera 110B, an audio speaker 140B, a monitor 130B, data input devices 150B and storage device 160B. The remote site computer system 20 is similarly coupled to the telephony network 30 by way of a telecommunications interface device 170B for transmitting signals through the telephony network and receiving signals therefrom.

Figure 2:
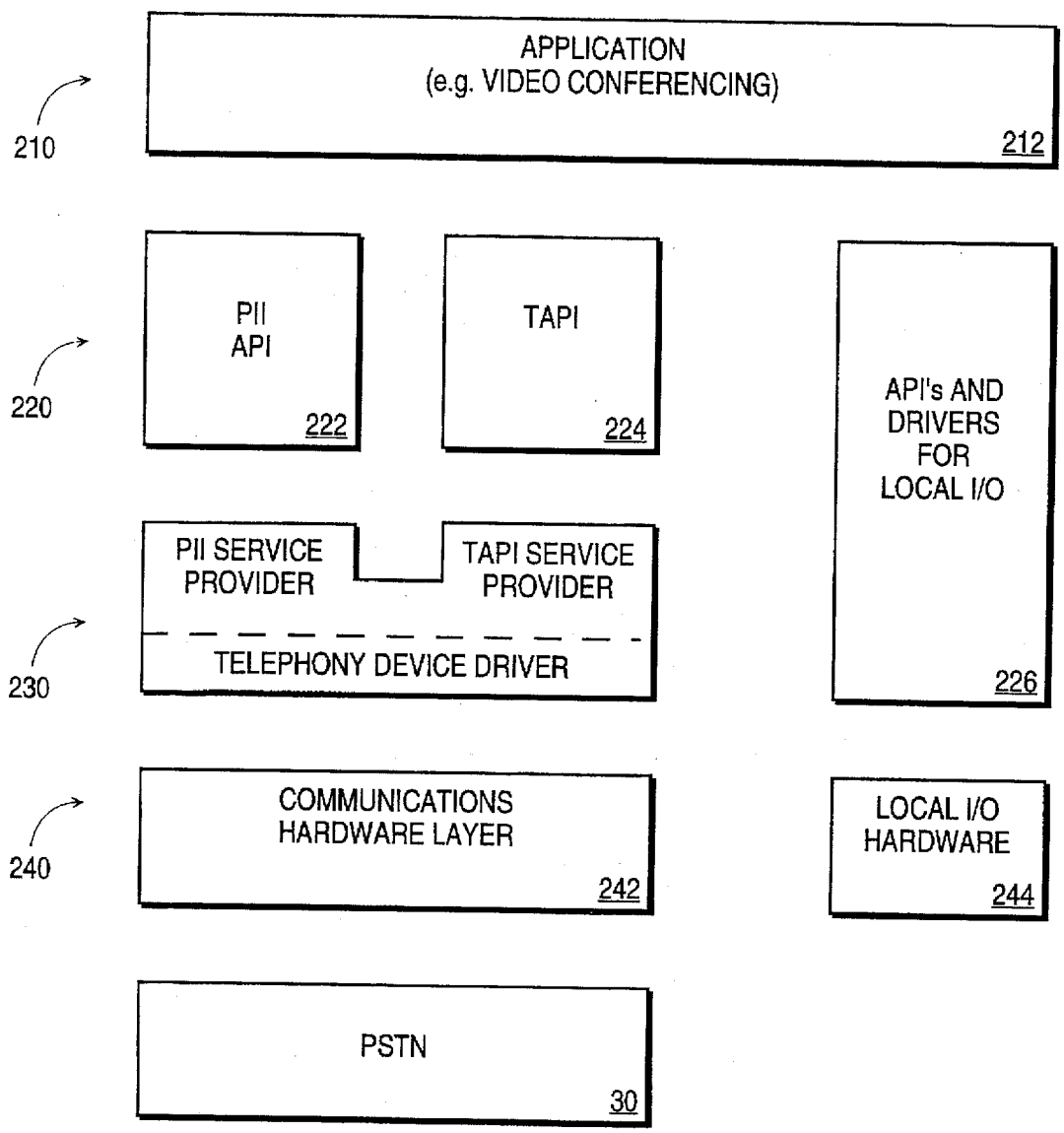
FIG. 2 is a block diagram of a software structure used in the preferred embodiment of the invention.

The computer systems 10 and 20 operate under control of software code which is stored, in use, in memory provided in the processing units 100A, 100B or storage devices 160A, 160B, respectively. The software is executed by the processing units, and comprises a number of levels of functionality as illustrated in the block diagram of FIG. 2. A suite of software functions 200 is shown arranged in layers in FIG. 2, comprising an application layer 210, an application programming interface layer (API layer) 220, and a service provider layer and device driver layer 230. The service provider and device driver layer 230 provides an interface to the hardware portions of the computer system (hardware layer 240) which in turn interfaces to the PSTN 30, as shown in FIG. 1.

In the present example, a conferencing application is provided at the application layer 210, comprising video conferencing application 212. The purpose of the video conferencing application is to allow a user of computer system 10 to communicate with a user of computer system 20 by way of the telephony network 30 by way of video, audio, and data transmissions. A video conferencing application 212 operating on computer system 10 of FIG. 1 thus acts to receive input from the input devices including the microphone 120A, the video camera 110A, and keyboard/mouse 150A and control the output of signals to the output devices including the monitor 130A and speaker 140A, as well as controlling the transmission and reception of signals through the telecommunication interface 170A. The application 212 is able to provide this functionality by utilizing functions provided by a dynamic linked library (DLL) of the application programming interface (API) layer. APIs and device drivers 226 are preferably provided for interfacing with the local I/O hardware, such as the audio and video subsystems (e.g. the microphone, speaker, video camera and monitor), as are known in the art, as well as APIs 222 and 224 relating to providing communication with other computer systems by way of the telephony network. The present invention relates to an API 222 (sometimes referred to as a Protocol Independent Interface or PII) for the communications aspect of the conferencing system. Another API 224, referred to as a telephony API (TAPI) is also provided, which enables advanced telephony features to be controlled by the application The features of TAPI are described, for example, in the Microsoft Systems Journal, December 1993 (Vol. 8, No. 12, pp 15–44), the disclosure of which is incorporated herein by reference.

The Protocol Independent Interface (PII) specification defines a network programming interface for Microsoft Windows (TM) which is a proper superset of the Windows Socket Interface version 1.1, frequently referred to as WinSock. As such, it is based on the "socket" paradigm popularized in the Berkeley Software Distribution (BSD) from the University of California at Berkeley. Like WinSock, it encompasses both familiar Berkeley socket style routines and a set of Windows-specific extensions designed to allow the programmer to take advantage of the message-driven nature of Windows (TM). A description of WinSock can be found, for example, in Programming WinSock (Arthur Dumas, Sams Publishing, 1995), the disclosure of which is also incorporated herein by reference.

PII is a transport layer interface corresponding to layer 4 in the OSI (Open Systems Interconnection) seven layer reference model of the International Standards Organization (ISO). It was created in order to address emerging network requirements which were not adequately addressed in either Windows (TM) Sockets or other networking interfaces generally available on the Windows (TM) platform. Some of the key areas where PII extends the current WinSock interface include:

Protocol Independence—PII provides a standardized interface which can be used in conjunction with any number of transport protocols. Application programmers create communications endpoints (or sockets) by specifying the address family to be used and the type of socket desired. PII uses this information to bind the socket to a particular transport provider. Transport providers have a single Service Provider Interface which they must support. By means of this interface they indicate the address families and socket types which they support.

Expanded Set of Socket Types—Having access to multiple transport protocols generates a need for additional socket types. PII incorporates an extensive set of socket types and adopts a more meaningful and uniform naming convention. Socket type names clearly indicate communications properties such as connectedness, reliability, preservation of transmission boundaries, directionality and isochronicity.

Shared Sockets—PII introduces a mechanism for a single socket to be shared across multiple applications. The sharing paradigm is appropriate for both Windows 3.1 (TM) and more advanced environments like Windows NT (TM) and Windows 95 (TM). One or more virtual sockets are created that each reference a single underlying socket. Each virtual socket has an independent notification mechanism, but shares all other aspects of the underlying socket.

Quality of Service—pII introduces a number of features related to quality of service (QOS). An extended version of the flow specification concept as outlined in IETF RFC 1363 is adopted. Flow specs describe a set of characteristics about a proposed flow through the network. An application may associate a flow spec with a socket at the time a connection request is made. This flow spec indicates parametrically what level of service is required and also stipulates how flexible the application is willing to be if the requested level of service is not available. An application may retrieve the flow spec associated with a socket to determine the actual level of service that the network is willing and/or able to provide. If conditions in the network change resulting in a reduction (or increase) in the available service level, a notification mechanism is included to indicate this.

Other QOS-related features include the ability to form socket groups and assign a flow spec to the group, support for performing send and receive operations from within interrupt context, and a callback style notification mechanism.

TAPI Integration—PII is designed to work hand-in-glove with the Windows Telephony API (TAPI) in providing uniform and consistent access to the data transport capabilities of telephony connections. Applications can establish and utilize telephony data connections without making any explicit calls to the TAPI interface (combined TAPI/PII service providers will silently establish telephony connections on behalf of the application). A TAPI-aware application may also obtain direct access to the underlying TAPI call handle for subsequent manipulation of the call using TAPI. Conversely, an application may use TAPI directly to establish and manipulate calls and then use PII to transport data over already-established calls An appendix to this specification sets forth Chapter 4 and Appendix A of the Protocol Independent Interface specification Version 1.5 which describes the functions implemented by the PII, including those available through the WinSock API together with a number of functions provided to enable implementation of the present invention. In the description of the preferred embodiment of the present invention which is presented hereinbelow, reference is made to the functions described in the appendix.

In a conferencing system according to the preferred embodiment of the invention, a plurality of data streams are passed between the local site computer system 10 (FIG. 1) and the remote site computer system 20 by way of the telephony network 30. An example of a software application in which the invention can be implemented is the ProShare line of personal conferencing products from Intel Corporation of Santa Clara, Calif. Preferably each of the computer systems 10 and 20 operate under control of a conferencing application 212 which is adapted to transmit and receive video and audio signals, as well as data signals which may originate either from the conferencing application itself or from another application running concurrently, such as an electronic whiteboard, time management application or the like, as are known in the art.

A typical video conferencing application will require at least two channels of communication in each direction. Each endpoint should be able to both send and receive video and audio data streams. It may also be useful for conferencing computer systems to share other data as well, such as data relating to another application also running at each endpoint, for example a spreadsheet application. The parties operating the conferencing computer systems may, for example, wish to discuss spreadsheet data by way of the audio and video channels whilst being able to manipulate the spreadsheet data at each endpoint. In order to achieve this at least one additional socket at each endpoint is required. Because the audio, video and data channels are related it is advantageous for them to be transmitted by way of the same telephony connection, rather than creating separate telephony connections, between the same endpoints, for each channel, as might ordinarily be the case. For this purpose the present invention provides a mechanism for grouping together a plurality of sockets to enable the telephony service provider to ascertain that the sockets are related and should share the same telephony connection.

Figure 3:
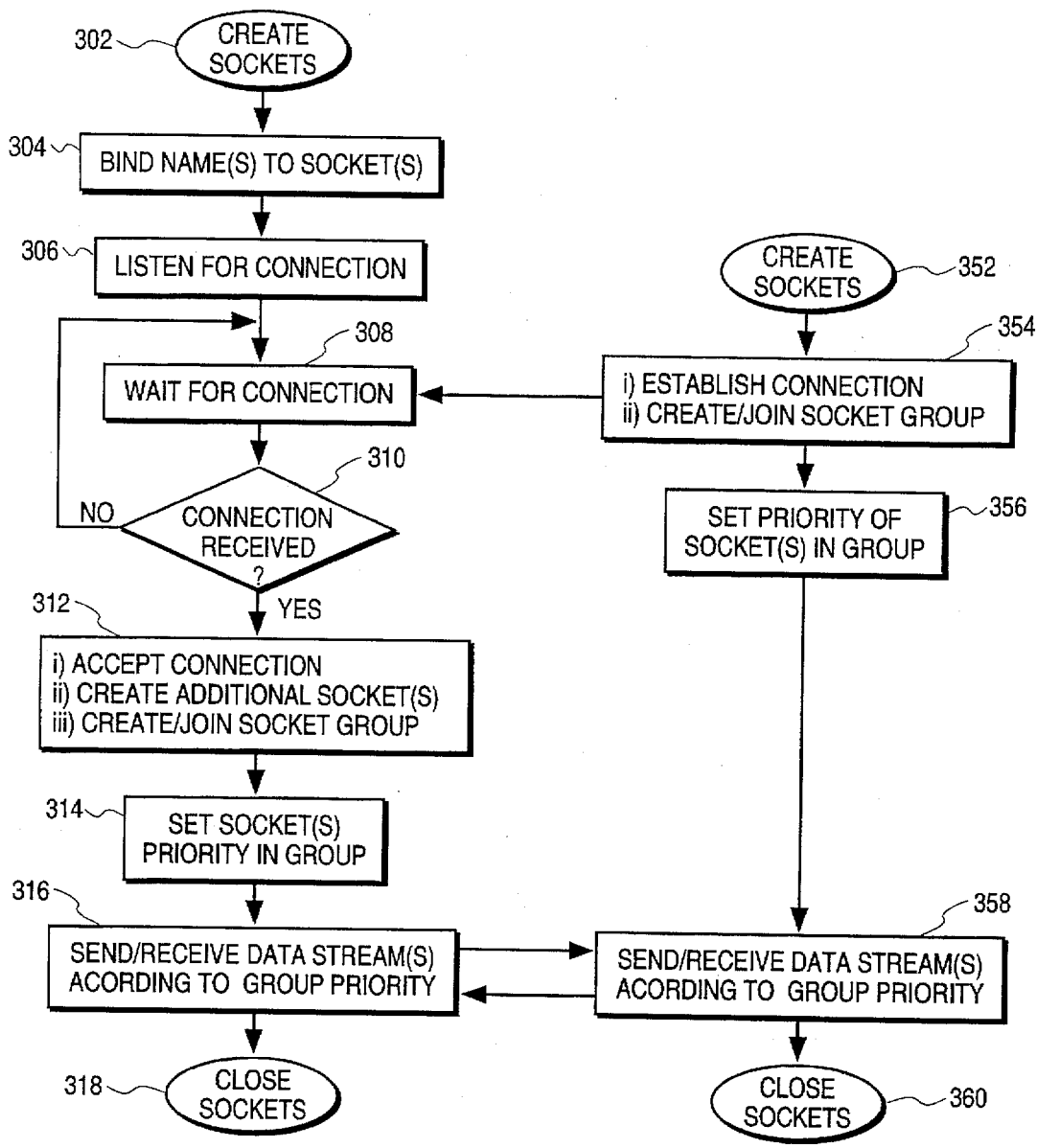
FIGS. 3, 4 and 5 are flowcharts illustrating communication procedures in accordance with the preferred embodiment.

FIG. 3 is a flowchart illustrating the general procedure for establishing communications between applications operating on remote computer systems. Flow chart portion 300 illustrates the general procedural steps carried out, for example, by remote site computer system 100B, and flowchart portion 350 shows the steps carried out by local site computer system 100A which initiates the connection. The remote site computer first creates at least one socket communication endpoint (step 302) using the socket() function (see appendix). Because the data is to be transmitted by way of a connection oriented telephony network, the socket(s) created will be "message stream" type socket(s), as opposed to connectionless, datagram type sockets. A name is assigned to each created socket, at step 304, using the bind() function, so that the socket can be addressed. The remote site application then listens for incoming connections on the sockets (step 306) using the listen() function, and waits until a connection is detected (steps 308 and 310).

When the local site computer wishes to communicate with the remote site, it creates at least one socket (step 352) to serve as a local endpoint for communication with the remote site application. The local site computer, using the telephony service provider and, for example, functions provided by TAPI proceeds to establish a telephony connection to the remote site connection. The local site application uses the WSAConnectEx() function in order to establish connections between the local sockets and those sockets listening at the remote site computer, and to form the local sockets into a socket group (step 354). When a connection is detected at the remote site computer, the WSAAcceptEx() function is employed to accept the connection from the local site sockets (step 312). Additional sockets are typically created for communication with the local site sockets, while the original sockets return to the listening state. The additional sockets are formed into a socket group corresponding to the local site socket group. Both the local and remote site applications then utilize the setsockopt() function to establish a priority level for each socket in the group (steps 314, 356) indicating to the respective service providers which sockets are to be given priority for transmission of data via the telephony connection.

When the procedures of flowcharts 300 and 350 reach steps 316 and 358, respectively, the local and remote grouped sockets created by the applications on the local and remote site computers are able to exchange data streams. The data for each socket is sent via the same telephony connection through the respective telecommunications interfaces 170A, 170B and the telephony network 30 (FIG. 1). The service provider 232 (FIG. 2) may be required to translate incoming and outgoing data between the format utilized by the application and, for example, an ISDN data format, as will be apparent to those skilled in the art. Once communication between the local and remote sockets has terminated, the telephony connection is broken and the respective local and remote sockets closed (step 360, 318).

The present invention enables a socket group to be associated with a particular quality of service (QOS) for the telephony connection. As is known to those of ordinary skill in the telecommunications field, the quality of service of a telephony connection is related to telecommunications parameters including bandwidth and error rate, which determine the quality of the telephony connection.

The basic QOS mechanism in PII revolves around the flow specification (or "flow spec") as described in RFC 1363. A brief overview of this concept is as follows:

Flow specs describe a set of characteristics about a proposed connection-oriented, unidirectional flow through the network. An application may associate flow specs with a socket (one flow spec for each direction for bi-directional sockets) at the time a connection request is made. The flow specs indicate parametrically what level of service is required and also stipulate how flexible the application is willing to be if the requested level of service is not available. (This ranges from "don't make a connection if I don't get all that I asked for", to "here is what I would like but I'll take anything I can get".) After a connection is established, the application may retrieve the flow specs associated with the socket and examine their contents to discover the level of service that the network is willing and/or able to provide. If the service provided is not acceptable, the application may close the socket and take whatever action is appropriate (e.g. scale back and ask for a lower quality of service, try again later, notify the user and exit, etc.).

Even after a flow is established, conditions in the network may change resulting in a reduction (or increase) in the available service level. A notification mechanism is included which utilizes the existing PII notification techniques to indicate to the application that QOS levels have changed. The application should again retrieve the corresponding flow spec and examine it in order to discover what aspect of their service level has changed.

Flow specs divide QOS characteristics into the following general areas:

1. Network bandwidth utilization—The manner in which the application's traffic will be injected into the network. This includes specifications for average bandwidth utilization, maximum burst duration and peak burst rate. It also includes an indication which the network may provide of minimum link bandwidth (i.e. how wide the skinniest pipe is between the two hosts).

2. Sensitivity to delay—Applications indicate a delay or latency value as a target for the network, with an understanding further reductions in delay below this value are of marginal use to the application. A means is also provided to stipulate the maximum mount of delay variant that can be tolerated.

3. Willingness to cope with data loss and service interruption—Loss properties are expressed in terms of both overall percentage of lost packets and maximum amounts of burst loss. Service interruption indicates how long the application is willing to tolerate loss of all communication with the endpoint before considering the connection broken.

4. Level of service guarantee—Applications are able to indicate a range of requirements, from the need for a ironclad guarantee to a willingness to accept whatever is available after merely expressing a hint about QOS preferences.

5. Flow content identification—Applications may select from a wide selection of well-known constants to identify the media content of a flow.

6. Cost sensitivity—An indication of how willing the application is to minimize communications cost to the possible detriment of other QOS parameters.

7. Communications security—Applications may specify a particular encryption system or option and identify public keys to be used.

Flow specs are only applicable to DSTREAM style sockets. An application indicates its desire for a non-default flow spec at the time a connection request is made (see WSAConnectEx()). Since establishing a flow specified connection is likely to involve cooperation and/or negotiation between intermediate routers and hosts, the results of a flow spec request cannot be determined until after the connection operation is fully completed. After this time, the application may use getsockopt() to retrieve the resulting flow spec structures so that it can determine what the network was willing and/or able to supply. Also, it is entirely possible that QOS conditions may change during the life of a connection. A means is provided, therefore, for a PII service provider to notify the application that it should access and inspect the current flow specs which will have one or more modified values.

The PII flow spec structure is defined in the PII header file PII.h and (also attached in the appendix hereto) and is reproduced below for discussion purposes. Portions of the comment fields shown in italics indicate the corresponding flow spec field identifier as found in RFC 1363.

```
typedef struct FlowSpec {
    int      iMaxMsgSize;        // MTU: Max message size: bytes
    float    fAvgBw;             // Token Bucket Rate: bytes/sec
    float    fBurstLength;       // Token Bucket Size: bytes
    float    fBurstRate;         // Max Trans Rate: bytes/sec
    float    fMinLinkSpeed;      // Size of thinnest pipe: bytes/sec
    int      iConnectionStatus;  // Status of the connection
    int      iMinDelaySel;       // Minimum Delay Noticed:
    float    fMinDelayValue;     // Delay value: usec
    float    fMaxDelayVariation; // Max Delay Variation: usec
    int      iLossSensitivity;   // Loss Sensitivity:
    float    fMaxLostPkts;       // Max # lost MTU's over . . .
    float    fLossInterval;      // Loss Interval in MTU's
    float    fMaxBurstLoss;      // Burst Loss Sensitivity
                                 // max # consec. lost MTU's
    int      iMaxSvcOutage;      // Max duration for svc outage: sec
    int      iQualOfGuarantee;   // Quality of Guarantee
    int      iFlowContent;       // flow content identifier
    int      iCostSensitivity;   // Cost sensitivity
    int      iEncryptionSel;     // Selected encryption algo
    char far *lpEncryptionKey;   // Pointer to desired key
} FLOWSPEC;
```

The sections which follow provide a detailed description of each field in the flow spec.

fMaxMsgSize

This field corresponds to the *Maximum Transmission Unit* (MTU) field in RFC 1363. It describes the maximum sized message (in bytes) that the application intends to send over the flow. This must, of course, be no larger than the value of SO_MAX_DG_SIZE for the underlying service provider. The intent of expressing this value in the flow spec is not to provide a hard limit for the application. Rather, it serves two different purposes.

First, it is a convenient unit for expressing loss properties. Using the default MTU of the internetwork is inappropriate since the internetwork may have a very large MTU, such as the 64 Kbytes of IP, but applications and hosts may be sensitive to losses of far less than an MTU's amount of data. For example, a voice application would be sensitive to a loss of several consecutive small packets.

Secondly, the MTU also bounds the amount of time that a flow can transmit, uninterrupted, on a shared media. Similarly, the loss rates of links that suffer bit errors will vary dramatically based on the MTU size.

fAvgBw

This field corresponds to the *Token Bucket Rate* field in RFC 1363. It is one of three fields used to define how traffic will be injected into the internetwork by the sending application. (The other two fields are fBurstLength and fBurstRate.)

As flow specs are based upon the well-known leaky bucket algorithm for flow control, this field and several others are described in terms of imaginary tokens and buckets. The token rate is the rate at which tokens (credits) are placed into an imaginary token bucket, expressed in bytes/second. For each flow, a separate bucket is maintained. To send a packet over the flow, a host must remove a number of credits equal to the size of the packet from the token bucket. If there are not enough credits, the host must wait until enough credits accumulate in the bucket.

Note that the fact that the rate is expressed in terms of a token bucket rate does not mean that hosts must implement token buckets. Any traffic management scheme that yields equivalent behavior is permitted. The field indicates the number of byte credits (i.e., right to send a byte) per second which are deposited into the token bucket.

The value zero is slightly special. It is used to indicate that the application is not making a request for bandwidth guarantees. If this field is zero, then the fBurstLength field must also be zero, and the type of guarantee requested may be no higher than predicted service (explained below).

fBurstLength

This field corresponds to the *Token Bucket Size* field in RFC 1363. It controls the maximum amount of data that the flow can send at the peak rate, and is expressed in terms of bytes. More formally, if the burst length is B, and the average rate is R, over any arbitrarily chosen interval T in the life of the flow, the amount of data that the flow sends cannot have exceeded B+(R*T) bytes.

The imaginary token bucket is filled at the token bucket rate. The bucket size (or burst length) limits how many credits the flow may store. When the bucket is full, new credits are discarded.

The field is ignored if the fAvgBw field is zero. Note that fBurstLength must be greater or equal to fMaxMsgSize. Zero is a legal value for the field and indicates that no credits are saved.

fBurstRate

This field corresponds to the *Maximum Transmission Rate* field in RFC 1363, and is expressed in bytes/second. This rate limits how fast packets may be sent back to back from the host. Consider that if the token bucket is full, it is possible for the flow to send a series of back-to-back packets, with the length of this run equal to the size of the token bucket (fBurstLength). If the token bucket size is large, this back-to-back run may be long enough to significantly inhibit multiplexing. To limit this effect, fBurstRate bounds how fast successive packets may be placed on the network.

One can think of fBurstRate as being a form of a leaky bucket. When a packet is sent, a number of credits equal to the size of the packet is placed into an empty bucket, which drains credits at the burst rate. No more packets may be sent until the bucket has emptied again.

fMinLinkSpeed

This field is an extension to the RFC 1363 flow spec, and is expressed in bytes/second. It is provided as a way for the network to supply useful information to the application. After a connection has been established, an application may examine this field in order to determine the capacity limitations of the underlying hops which the connection spans. All such hops will have a capacity greater than or equal to fMinLinkSpeed.

A typical way for an application to use this field would be to initiate a connection requesting the lowest possible level of service. Once the connection is established, the application may then determine that higher levels of service are likely possible. It may then elect to either modify its use of the socket or perhaps trade its current socket in on one with a higher level of service.

A value of zero implies that this information is not available from the network. This field is undefined for unconnected sockets.

iConnectionStatus

This field is an extension to the RFC 1363 flow spec. It is provided as a way for the network to indicate a change in the connection status to the application using one of the following manifest constants as values: OPERATIONAL, INTERRUPTED, or SUSPENDED. Typical scenarios might include: connection status on our cellular modem link changes to INTERRUPTED because our car just drove into a tunnel, and then changes back to OPERATIONAL when we come out the other side. Later on connection status changes to SUSPENDED because we are going into power conservation mode. The availability of connection status may be especially useful for situations where the iMaxSvcOutage value is fairly long.

A value of UNKNOWN implies that this information is not available from the network. This field is undefined for unconnected sockets.

fMinDelaySet and fMinDelayValue

These two fields both map to the *Minimum Delay Noticed* field in RFC 1363. PII uses two fields because in the RFC the corresponding value may either be one of a set of manifest constants or a floating point number. The fMinDelaySel field is used to represent the manifest constant, and, if applicable, the fMinDelayValue field is used to store the floating point value in microseconds.

The minimum delay noticed field tells the internetwork that the host and application are effectively insensitive to improvements in end-to-end delay below this value. The network is encouraged to drive the delay down to this value but need not try to improve the delay further.

If expressed as a number it is the number of microseconds of delay below which the host and application do not care about improvements. Human users only care about delays in the millisecond range but some applications will be computer to computer and computers now have clock times measured in a handful of nanoseconds. For such computers, microseconds are an appreciable time. For this reason, this field measures in microseconds, even though that may seem small.

Manifest constants for iMinDelaySel are as follows:

NO_DELAY_SENSITIVITY—the application is not sensitive to delay

MODERATE_DELAY_SENSITIVITY—the application is moderately delay sensitive (e.g., avoid satellite links where possible)

NUMERIC_DELAY_SENSITIVITY—the application is sensitive to delay as expressed in fMinDelay Value fMaxDelay Variation This field corresponds to the *Maximum Delay Variation* field in RFC 1363. It is the difference, in microseconds, between the maximum and minimum possible delay that a packet will experience. If a receiving application requires data to be delivered in the same pattern that the data was transmitted, it may be necessary for the receiving host to briefly buffer data as it is received so that the receiver can restore the old transmission pattern. (An easy example of this is a case where an application wishes to send and transmit data such as voice samples, which are generated and played at regular intervals. The regular intervals may be disturbed by queuing effects in the network and the receiver may have to restore the regular spacing.)

The amount of buffer space that the receiving host is willing to provide determines the amount of variation in delay permitted for individual packets within a given flow. The maximum delay variation field makes it possible to tell the network how much variation is permitted.

The value of 0, meaning the receiving host will not buffer out delays, is acceptable but the receiving host must still have enough buffer space to receive a maximum transmission unit sized packet from the sending host. Note that it is expected that a value of 0 will make it unlikely that a flow can be established.

iLossSensitivity, fMaxLostPkts and fLossInterval

These fields together correspond to the *Loss Sensitivity* and *Loss Interval* fields in the RFC.

iLossSensitivity takes on one of the following well-known values:

NO_LOSS_SENSITIVITY—The application is not sensitive to loss, relying on higher level protocols if needed SOME_LOSS_SENSITIVITY—The application is sensitive to loss but is not specifying a numeric requirement. Where possible, the network should choose a path with minimal loss.

NUMERIC_LOSS_SENSITIVITY—The application requires that loss characteristics be as described in fMaxLostPkts and fLossInterval.

fMaxLostPkts specifies the maximum number of MTU sized packets that may be lost over an interval during which fLossInterval MTU sized packets were sent. Thus, taken together, these values specify an average loss percentage.

fMaxBurstLoss

This field corresponds to the *Burst Loss Sensitivity* field in the RFC. It states how sensitive the application's flow is to losses of consecutive packets. The field enumerates the maximum number of consecutive MTU sized packets that may be lost. A value of zero indicates that the flow is insensitive to burst loss.

Note that it is permissible to set the iLossSensitivity field to simply indicate some sensitivity to loss, and set a numerical limit on the number of consecutive packets that can be lost.

fMaxSvcOutage

This field represents an extension to the RFC flow spec. It indicates to the network a time interval, expressed in seconds (not microseconds), during which communications over the connection may be interrupted without considering the connection to be permanently broken. A value of zero indicates no preference on behalf of the application, and that the underlying service provider's default value should be used.

iQualOfGuarantee

This field corresponds to the *Quality of Guarantee* field in the RFC. It is expected that the internetwork will likely have to offer more than one type of guarantee. There are two unrelated issues related to guarantees.

First, it may not be possible for the internetwork to make a firm guarantee. Consider a path through an internetwork in which the last hop is an Ethernet. Experience has shown (e.g., some of the IETF conferencing experiments) that an Ethernet can often give acceptable performance, but clearly the internetwork cannot guarantee that the Ethernet will not saturate at some time during a flow's lifetime. Thus it must be possible to distinguish between flows which cannot tolerate the small possibility of a failure (and thus must guaranteed at every hop in the path) and those that can tolerate islands of uncertainty.

Second, it is presumed that some applications will be able to adapt to modest variations in internetwork performance and that network designers can exploit this flexibility to allow better network utilization. In this model, the internetwork would be allowed to deviate slightly from the promised flow parameters during periods of load. This class of service is called predicted service (to distinguish it from guaranteed service).

The difference between predicted service and service which cannot be perfectly guaranteed (e.g., the Ethernet example mentioned above) is that the imperfect guarantee makes no statistical promises about how it might misbehave. In the worst case, the imperfect guarantee will not work at all, whereas predicted service will give slightly degraded service. Note too that predicted service assumes that the routers and links in a path all cooperate (to some degree) whereas an imperfect guarantee states that some routers or links will not cooperate.

There are six legal values:

NO_GUARANTEE—no guarantee is required (the host is simply expressing desired performance for the flow)

IMPERFECT_GUARANTEE_REQUESTED—an imperfect guarantee is requested.

PREDICTED_SVC_REQUIRED—predicted service is requested and if unavailable, then no flow should be established.

PREDICTED_SVC_REQUESTED—predicted service is requested but an imperfect guarantee is acceptable.

GUARANTEED_SVC_REQUIRED—guaranteed service is requested and if a firm guarantee cannot be given, then no flow should be established.

GUARANTEED_SVC_REQUESTED—guaranteed service is requested and but an imperfect guarantee is acceptable.

Application developers should realize that asking for predicted service or permitting an imperfect guarantee will substantially increase the chance that a flow request will be accepted.

iFlowContent

This field represents an extension over the flow spec defined in the RFC. The allowed values are all manifest constants which indicate the type of media being transported over the flow. Use of this field is optional. Its purpose is to provide a simplified alternative to specifying QOS parametrically. For service providers that are "tuned" to transport certain types of media, merely identifying the socket as bearing a recognized media type may be sufficient to identify needed QOS levels. Currently defined values include
UNSPECIFIED
GSM_AUDIO
ADPCM_AUDIO
INDEO_PRV
INDEO_IRV
INDEO_MRV
H261
MPEG1
MPEG2
MPEG4
JPEG
SVC_PROVIDER_SPECIFIC—service providers are free to define their own constants for media streams with values greater than or equal to this.

iCostSensitivity

This field represents an extension over the flow spec defined in the RFC. The allowed values are manifest constants which indicate whether or not the application wishes to minimize any costs associated with a connection to the possible detriment of other QOS parameters. Allowed values are:

NOT_COST_SENSITIVE—the application considers cost to be a secondary concern or no concern at all COST_SENSITIVE—the application considers cost to be a primary concern and wishes to minimize it where possible.

iEncryptionSel and ipEncryptionKey

These fields represents an extension over the flow spec defined in the RFC. They are used to indicate the application's choice for encryption algorithms (if any) and also to specify a pointer to where an encryption key may be found. Interpretation of the memory contents pointed to by the encryption key pointer is service provider/encryption algorithm specific. Values for the iEncryptionSel field are also service provider specific, with the convention that zero is used to indicate that no encryption is being requested.

A default flow spec is associated with each socket group at the time it is created. Field values for this default flow spec are indicated below. In all cases these values indicate that no particular flow characteristics are being requested from the network. Applications only need to modify values those fields which they are interested in, but must be aware that there exists some coupling between fields as was described above.

| | |
|---|---|
| iMaxMsgSize = | SO_MAZ_DG_SIZE for the particular service provider |
| fAvgBw = | 0, no bandwidth request |
| fBurstLength = | 0, not applicable because fAvgBw is zero |
| fBurstRate = | 0, not applicable because fAvgBw is zero |
| fMinLinkSpeed = | supplied by network, undefined until connection occurs |
| iConnectionStatus = | supplied by network, undefined until connection occurs |
| iMinDelaySet = | NO_DELAY_SENSITIVITY |
| fMinDelay Value = | 0, not applicable |
| fMaxDelay Variation = | 0, not applicable |
| iLossSensitivity = | NO_LOSS_SENSITIVITY |
| fMaxLostPkts = | 0, not applicable |
| fLossInterval = | 0, not applicable |
| fMaxBurstLoss = | 0, not applicable |
| fMaxSvcOutage = | 0, use provider defaults for time-out |
| iQualOfGuarantee = | NO-GUARANTEE |
| iFlowContent = | UNSPECIFIED |
| ICostSensitivity = | NOT_COST_SENSITIVE |
| iEncryptionSel = | 0, no encryption requested |
| ipEncryptionKey = | NULL X |

Figure 4:
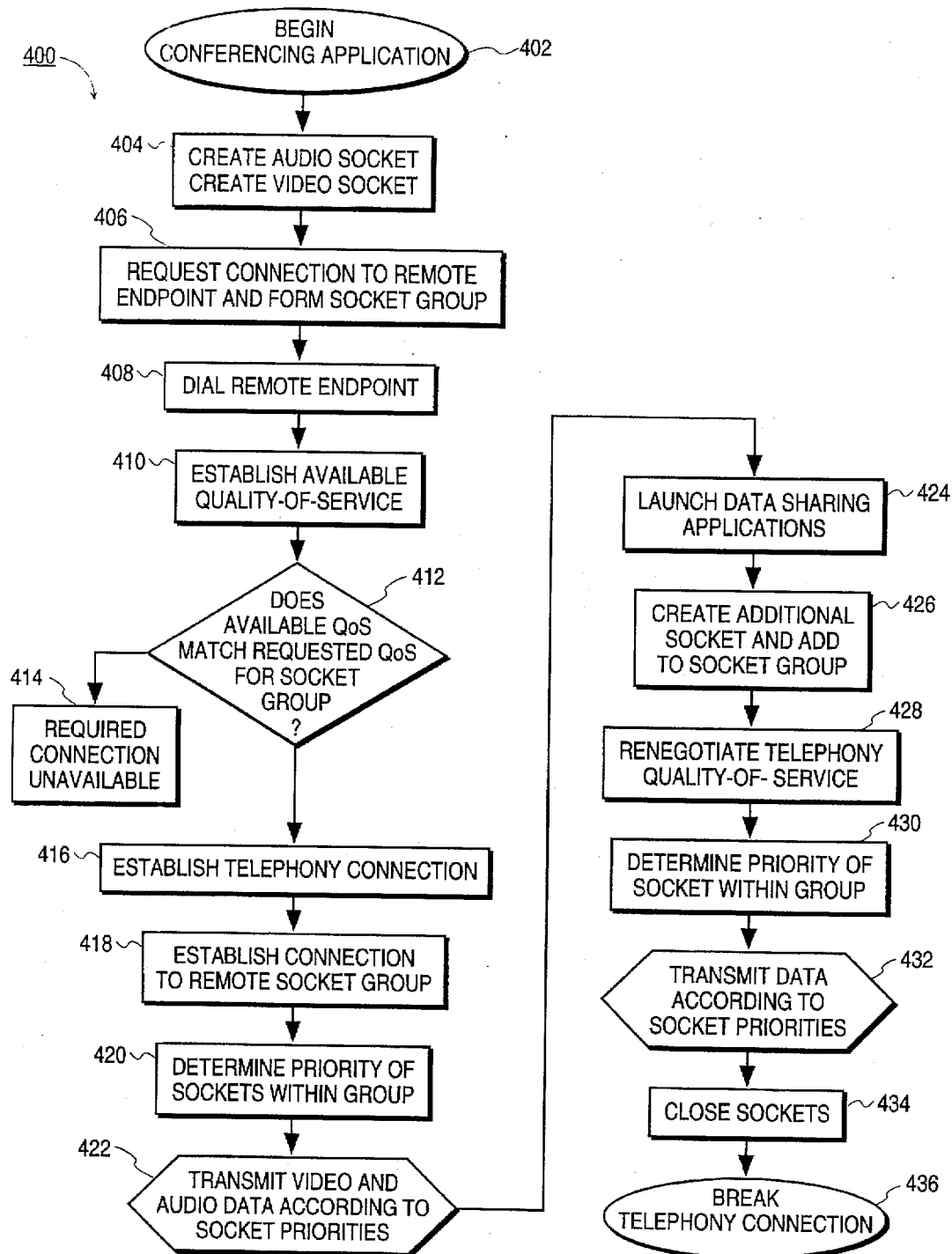

FIG. 4 shows a flowchart 400 of the procedural steps which may be undertaken during a conferencing session utilizing application software employing an embodiment of the present invention. A video conferencing application is launched at step 402, which creates an audio socket and video socket (step 404) for establishing communication with a remote endpoint (also running a conferencing application). The sockets are formed into a group, at step 406, and a connection to a remote endpoint is specified (WSAConnectEx() function). The service provider interprets the remote endpoint address and dials the remote endpoint through the telephony network (step 408). The service provider utilizes ISDN protocols to determine the quality-of-service parameters which are available through the telephony network to the remote endpoint at step 410. The quality-of-service which is desired for the socket group is established by the conferencing application as a flow spec and is stored at a location indicated by the pointer CpA-Flowspec (see WSAConnectEx() function). If the available quality-of-service parameters at least match the quality-of-service parameters required by the socket group (step 412) then the telephony connection is established with that quality-of-service (step 416) otherwise the connection is declined (step 414). The procedure for establishing a telephony connection according to an embodiment of the invention is described in greater detail hereinbelow with reference to FIG. 5.

Once the telephony connection has been established (step 416), a connection to the socket group at the remote endpoint is established at step 418, for example by application of the WSAAcceptEx() function. The priority of sockets within the socket group is determined (step 420), in this case the audio socket having a higher priority than the video socket. Communication between the video conferencing applications commences at step 422, with data being transmitted between the respective audio and video sockets according to their priorities. This means that, since the audio socket is assigned a higher priority than the video socket, audio data to be sent over the telephony connection is given priority of transmission on the telephony connection over the video data. For example, if a packet of compressed video a packet of compressed audio data are both queued for transmission by the transport service provider, the audio data will be transmitted before the video data regardless of the order in which they arrived for transmission. Indeed, a preemptive priority transmission system may be employed such that even if a packet of video data is in the process of transmission when an audio data packet arrives, transmission of the video packet is interrupted in order to send the audio data having a higher priority. The local and remote site computers are thus able to communicate audio and video data between their respective conferencing applications, with the audio data enjoying priority of transmission so as to improve the appearance of continuity to the users.

During the course of the video conference, the users may wish to discuss, for example, a spreadsheet document, with each party being able to view and modify the spreadsheet from their respective computer. Thus, a spreadsheet data sharing application is launched at step 424 in flowchart procedure 400, which proceeds to create an additional socket and add that socket to the existing socket group (step 426). The additional socket is created to enable the spreadsheet application running at the local site to share data with the spreadsheet application running at the remote site. If additional bandwidth is required for transmission of the additional data on the telephony connection, the transport service provider may re negotiate the quality of service parameters with the telephony network (step 428). The application determines a priority for the additional socket with respect to the audio and video sockets at step 430. In this instance the data sharing socket may be allocated a priority which is lower than the audio socket and higher than the video socket. Transmission of data by way of the data sharing socket commences at step 432, with the spreadsheet data being multiplexed across the same telephony connection as the audio and video data according to their relative priorities. It will be apparent to those in the art that more than one data sharing application may be utilized at one time, requiring additional sockets for each additional application. Steps 424 to 432 would therefore be repeated for each additional data sharing application launched during the conferencing session. At the end of the video conference the sockets utilized for communicating between the applications are closed (step 434) and the telephony connection is terminated (step 436).

Figure 5:
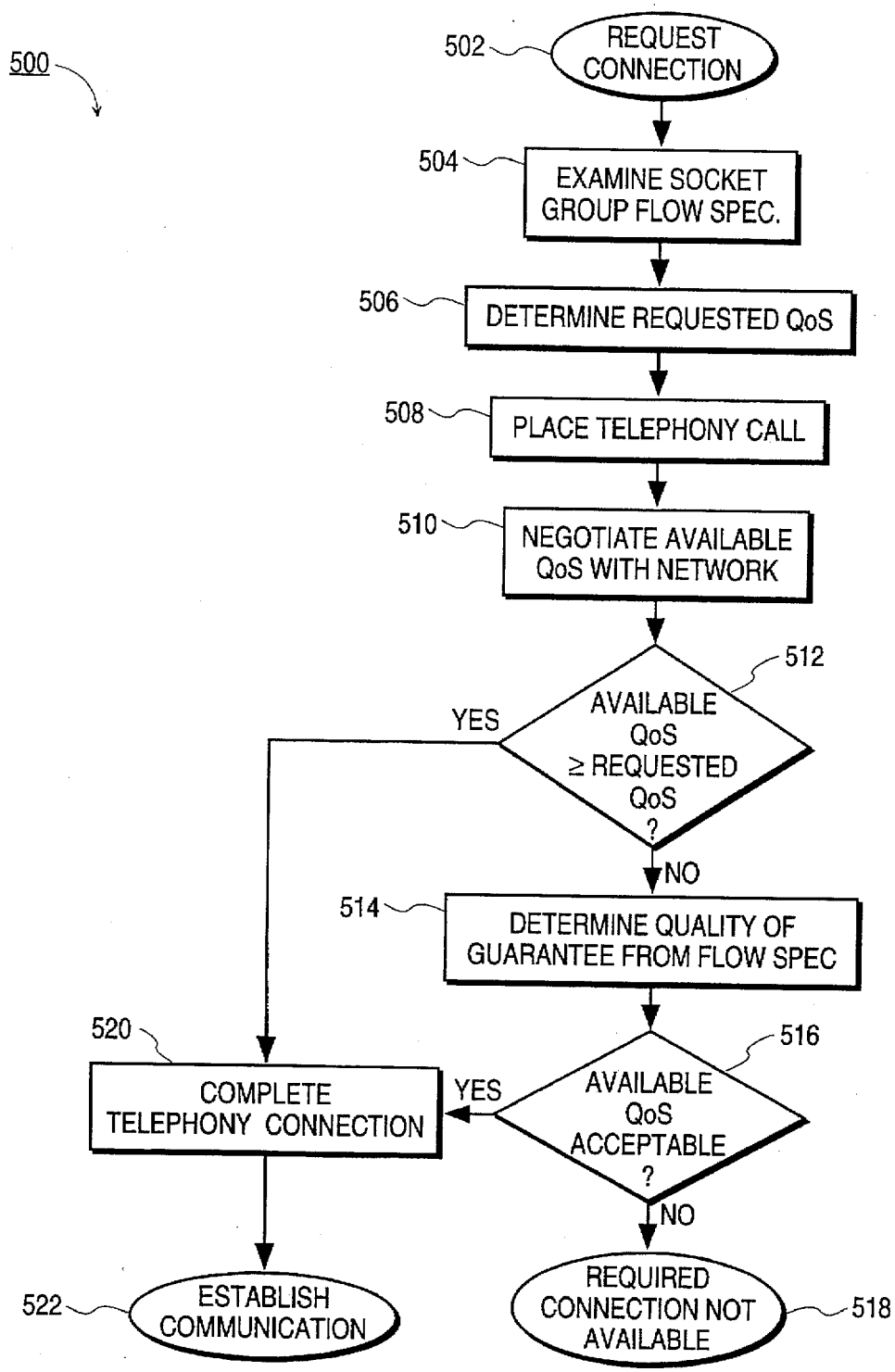

Referring now to FIG. 5, there is shown a flowchart 500 of procedural steps which may be undertaken by the transport service provider during establishment of a telephony connection in accordance with the preferred embodiment of the invention. A request for a telephony connection is received by the service provider at step 502 such as from an application employing the PII API. The request for connection indicates a group of sockets which are to pass data over the telephony connection. The flow spec for the socket group is retrieved using the pointer *IpSFlowspec* (see WSAConnectEx() function definition) in order to determine the quality-of-service which is requested or required by the socket group (steps 504 and 506). The service provider places a call via the telephony network (step 508) and negotiates with the network as to the quality-of-service that is available for a telephony connection to the desired endpoint (step 510). A comparison is made between the quality-of-service which is requested for use by the socket group and that which is indicated as available by the telephony network at step 512. If the available QoS at least matches the requested quality of service then the telephony connection is completed (step 520) and communication between the local and remote site socket groups can commence (step 522). If, however, the available QoS does to meet the QoS of the socket group flow spec, the flow spec is again examined to determine the Quality of Guarantee (iQualOfGuarantee field) specified by the socket group. If the QoS available from the network is nevertheless acceptable for the socket group (step 516), as indicated by the flow spec Quality of Guarantee value, even though the service does not necessarily match the other flow spec parameters, a connection is made at step 520. On the other hand, if the quality of guarantee flow spec value indicates that the service available is not acceptable, such as a GUARANTEED_SVC_REQUESTED value when the available network QoS cannot be guaranteed, then no connection is established and the procedure terminates (step 518).

The foregoing detailed description of the invention in relation to a preferred embodiment thereof has been put forward by way of example only, and it is to be understood that the features presented therein are not to be considered limiting to the scope of the invention which is defined in the claims appended hereto.

What is claimed is:

1. A method for communicating a plurality of dam streams from at least one first computer process operating on a first computer under a socket based transport interface to at least one second computer process operating on a second computer under a socket based transport interface, by way of a connection-oriented telephony network, comprising the steps of:
    creating a first socket group comprising a first plurality of socket communication endpoints for use by said at least one first computer process on said first computer, said first socket group corresponding to a single telephony connection;
    determining a required quality-of-service associated with said first socket group;
    establishing said telephony connection by way of said connection-oriented telephony network between said first and second computers, said telephony connection having a quality-of-service at least equal to said required quality-of-service;
    creating a second socket group comprising a second plurality of socket communication endpoints for use by said at least one second computer process on said second computer, said second socket group corresponding to said single telephony connection, and establishing a plurality of communication channels between each of said first plurality of sockets and corresponding ones of said second plurality of sockets, said plurality of communication channels comprised by said telephony connection; and
    transmitting a plurality of data streams between said at least one first process on said first computer and said at least one second process on said second computer by way of said plurality of communication channels multiplexed on said telephony connection.

2. A method as claimed in claim 1, wherein the step of establishing a telephony connection includes determining an available quality-of-service from said telephony network to said second computer, and comparing said available quality-of-service with said required quality-of-service associated with said first socket group to determine whether a telephony connection to said second computer having a quality-of-service at least equal to said required quality-of-service can be made.

3. A method as claimed in claim 2, wherein said required quality-of-service is defined by a flow specification which includes an indication of a desired minimum data transmission rate, a desired maximum transmission delay variation, and a desired quality of guarantee for the telephony connection.

4. A method as claimed in claim 3, wherein if the available quality-of-service does not at least equal said required quality of service, said telephony connection is established conditional upon the difference between said available quality-of-service and said required quality of service, and said desired quality of guarantee.

5. A method as claimed in claim 1, including a step of assigning a respective priority value to each socket in said first socket group, wherein said transmitting step includes transmitting a data stream corresponding to a said socket having a higher priority in preference to a data stream corresponding to a socket having a lower priority.

6. A method as claimed in claim 5, wherein said transmitting step includes a step of temporarily suspending transmission of data from a socket having a lowest assigned priority amongst said first and second plurality of sockets comprising said first and second socket groups.

7. A method as claimed in claim 5, wherein said first plurality of sockets comprising said first socket group includes a socket for transmission and reception of audio data and a socket for transmission and reception of video data, the audio data socket being assigned a higher priority than the video data socket.

8. A method as claimed in claim 1, wherein said at least one first computer process comprises a computer conferencing application for exchanging audio and video data with said at least one second process, said plurality of first sockets including an audio data socket and a video data socket.

9. A method as claimed in claim 8, wherein said at least one process includes a data sharing application, and wherein said plurality of first sockets includes a data sharing socket for transmission and reception of text and/or graphical data.

10. A method as claimed in claim 1, wherein said telephony network comprises an Integrated Services Digital Network.

11. A method as claimed in claim 1, wherein said telephony network comprises an Asynchronous Transfer Mode network.

12. A method as claimed in claim 1, including the steps of:
    creating a further socket at said first computer, after the establishment of said telephony connection;
    designating said further socket as belonging to said first socket group, and establishing a connection to a corresponding socket at said second computer by way of said telephony connection.

13. A computer conferencing system for use on a computer operating under a Windows (TM) operating system with a socket based transport interface, comprising:
    a video data source for digitizing visual information so as to generate a video data stream;
    an audio data source for digitizing sound information so as to generate an audio data stream;
    a display device for displaying incoming video data;
    a speaker device playing incoming audio data;
    a telephony interface device coupled to send and receive data signals by way of a telephony connection on a telephony network;
    a processing unit executing a conferencing application, the processing unit being coupled to the video data source, the audio data source, the display device, the speaker device and the telephony interface, the conferencing application including a plurality of sockets comprising a socket group, said socket group corresponding to said telephony connection, said socket group including an audio data socket for transmitting said audio data stream and receiving said incoming audio data by way of said telephony interface device and a video data socket for transmitting said video data stream and receiving said incoming video data by way of said telephony interface device, said socket group being associated with a required quality-of-service, the processing unit including a transport interface which controls said telephony interface device so as to establish a telephony connection on said telephony network having a quality-of-service in accordance with the required quality of service for said socket group a plurality of local sockets to collect data from multiple local data servers, and then transmitting that collected data over a single socket to the remote workstation using a connection with a desired quality of service.

* * * * *

UNITED STATES PATENT AND TRADEMARK OFFICE
CERTIFICATE OF CORRECTION

PATENT NO.   :   5,674,003
DATED        :   October 7, 1997
INVENTOR(S)  :   Andersen et al.

It is certified that error appears in the above-identified patent and that said Letters Patent is hereby corrected as shown below:

In column 3 at line 33 delete "derision" and insert --decision--

In column 9 at line 21 delete "mount" and insert --amount--

In column 17 at line 15 delete "dam" and insert --data--

Signed and Sealed this

Sixth Day of January, 1998

Attest:

BRUCE LEHMAN

Attesting Officer

Commissioner of Patents and Trademarks